US008950544B2

United States Patent
Yoshioka et al.

(10) Patent No.: US 8,950,544 B2
(45) Date of Patent: Feb. 10, 2015

(54) BALL SCREW AND ELECTRIC POWER STEERING SYSTEM INCLUDING BALL SCREW

(71) Applicant: JTEKT Corporation, Osaka-shi, Osaka (JP)

(72) Inventors: Kazuya Yoshioka, Kashiwara (JP); Kosuke Yamanaka, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/085,190

(22) Filed: Nov. 20, 2013

(65) Prior Publication Data
US 2014/0144263 A1    May 29, 2014

(30) Foreign Application Priority Data

Nov. 28, 2012  (JP) ................. 2012-260328

(51) Int. Cl.
*B62D 3/08*   (2006.01)
*F16H 25/22*  (2006.01)
*B62D 5/04*   (2006.01)
*F16H 25/20*  (2006.01)

(52) U.S. Cl.
CPC .......... *F16H 25/2204* (2013.01); *B62D 5/0448* (2013.01); *F16H 25/2021* (2013.01)
USPC ....................................... 180/444

(58) Field of Classification Search
CPC .............. B62D 5/0445; B62D 5/0448
USPC ............. 180/444; 74/89.36, 89.42, 388 PS, 74/424.82, 424.86, 424.87, 424.76
See application file for complete search history.

(56) References Cited

FOREIGN PATENT DOCUMENTS

| DE | 199 114 32 A1 | 9/2000 |
| EP | 1 270 370 A2 | 1/2003 |
| JP | 2002-039316 | * 2/2002 |
| JP | A-2002-003931 | 2/2002 |
| JP | A-2002-039316 | 2/2002 |
| JP | A-2002-276765 | 9/2002 |

OTHER PUBLICATIONS

Mar. 21, 2014 European Search Report issued in European Application No. 13193987.8.

* cited by examiner

*Primary Examiner* — Joseph Rocca
*Assistant Examiner* — Felicia L Brittman
(74) *Attorney, Agent, or Firm* — Oliff PLC (57) ABSTRACT

There are provided a ball screw that makes it possible to prevent a situation where a large load is applied to a part of a plurality of balls, and an electric power steering system including the ball screw. The ball nut is a component that surrounds a part of the male thread groove, and has a nut inner surface and a female thread groove. The female thread groove is formed in the nut inner surface, and forms a part of the rolling path. A female thread diameter varies according to a position in an axial direction of the ball nut. The female thread diameter is larger at each axial end of the ball nut than at an axially intermediate portion of the ball nut, and the female thread diameter is larger at one axial end than at the other axial end.

7 Claims, 7 Drawing Sheets

BALL SCREW AND ELECTRIC POWER STEERING SYSTEM INCLUDING BALL SCREW

INCORPORATION BY REFERENCE

The disclosure of Japanese Patent Application No. 2012-260328 filed on Nov. 28, 2012 including the specification, drawings and abstract, is incorporated herein by reference in its entirety.

BACKGROUND OF THE INVENTION

1. Field of the Invention

The invention relates to a ball screw and an electric power steering system including the ball screw.

2. Description of the Related Art

A conventional ball screw includes a ball screw shaft, a ball nut, a plurality of balls, and a rolling path. The plurality of balls moves in the rolling path as the ball nut rotates with respect to the ball screw shaft. Japanese Patent Application Publication No. 2002-276765 (JP 2002-276765 A) discloses an example of the conventional ball screw.

In the conventional ball screw, when a load acts on the ball screw shaft, flexural deformation of the ball screw shaft is caused. At this time, magnitudes of the loads that are applied to the respective balls are different from each other. In the ball screw described in JP 2002-276765 A, no consideration is given to that the loads with different magnitudes are applied to the respective balls due to the flexural deformation of the ball screw shaft. Therefore, in the ball screw, a large load may be applied to a part of the plurality of balls.

SUMMARY OF THE INVENTION

An object of the invention is to provide a ball screw that makes it possible to prevent a situation where a large load is applied to a part of a plurality of balls, and to provide an electric power steering system including the ball screw.

1) An aspect of the invention includes the following ball screw. The ball screw includes: a ball screw shaft; a ball nut; a plurality of balls; and a rolling path. The rolling path is formed between the ball screw shaft and the ball nut. The balls are disposed in the rolling path. The ball screw shaft has a screw shaft outer surface and a male thread groove. The male thread groove is formed in the screw shaft outer surface and forms a part of the rolling path. The ball nut is a component that surrounds a part of the male thread groove or the entire male thread groove, the ball nut having a nut inner surface and a female thread groove. The female thread groove is formed in the nut inner surface and forms a part of the rolling path. A female thread diameter that is a diameter of the female thread groove varies according to a position in an axial direction of the ball nut, the female thread diameter being larger at each of axially ends of the ball nut than at an axially intermediate portion of the ball nut, and the female thread diameter being larger at one of the axially ends than at the other of the axially ends.

The inventors of the present application conducted a test regarding a load applied to each of a plurality of balls. As a result, the inventors confirmed that the load applied to each ball is correlated with the amount of flexural deformation of the ball screw shaft. Thus, the above-described ball screw has the female thread diameter set based on the above-described finding.

In other words, the above-described ball screw has a structure in which the female thread diameter varies according to the position in the axial direction of the ball nut. Therefore, the clearance between each of the balls disposed in a portion, in which the amount of flexural deformation of the ball screw shaft is large, and the female thread groove or the male thread groove is larger than the clearance between each of the balls disposed in a portion, in which the amount of flexural deformation of the ball screw shaft is small, and the female thread groove or the male thread groove. Consequently, a small load is applied to each of the balls disposed in the portion in which the amount of flexural deformation of the ball screw shaft is large, as compared to a ball screw in which the female thread diameter is uniform in the entire ball nut. Therefore, it is possible to prevent a situation where a large load is applied to a part of the plurality of balls.

Further, the amount of flexural deformation of the ball screw shaft is larger at a portion of the ball screw shaft, which corresponds to each of the axially ends of the ball nut, than at a portion of the ball screw shaft, which corresponds to the axially intermediate portion of the ball nut. Therefore, the load applied to each of the balls disposed at each of the axially ends of the ball nut is larger than the load applied to each of the balls disposed at the axially intermediate portion of the ball nut. The above-described ball screw has the female thread diameter set based on the finding. In this aspect, the clearance between each of the balls disposed at each of the axially ends of the ball nut and the female thread groove or the male thread groove is larger than the clearance between each of the balls disposed at the axially intermediate portion of the ball nut and the female thread groove or the male thread groove. Consequently, a small load is applied to each of the balls disposed at each of the axially ends of the ball nut, as compared to a ball screw in which the female thread diameter at the axially intermediate portion of the ball nut is the same as the female thread diameter at the axially ends of the ball nut.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described with reference to the accompanying drawings. The configuration of an electric power steering system 1 will be described with reference to FIG. 1. The electric power steering system 1 includes a steering system body 10, an electric motor 20, and a ball screw 30. A steering assist system of the electric power steering system 1 is a rack-coaxial type assist system. In the rack-coaxial type assist system, a nut 50 of the ball screw 30 is directly rotated by the electric motor 20 to move a rack shaft 13 in a translational direction.

Figure 1:
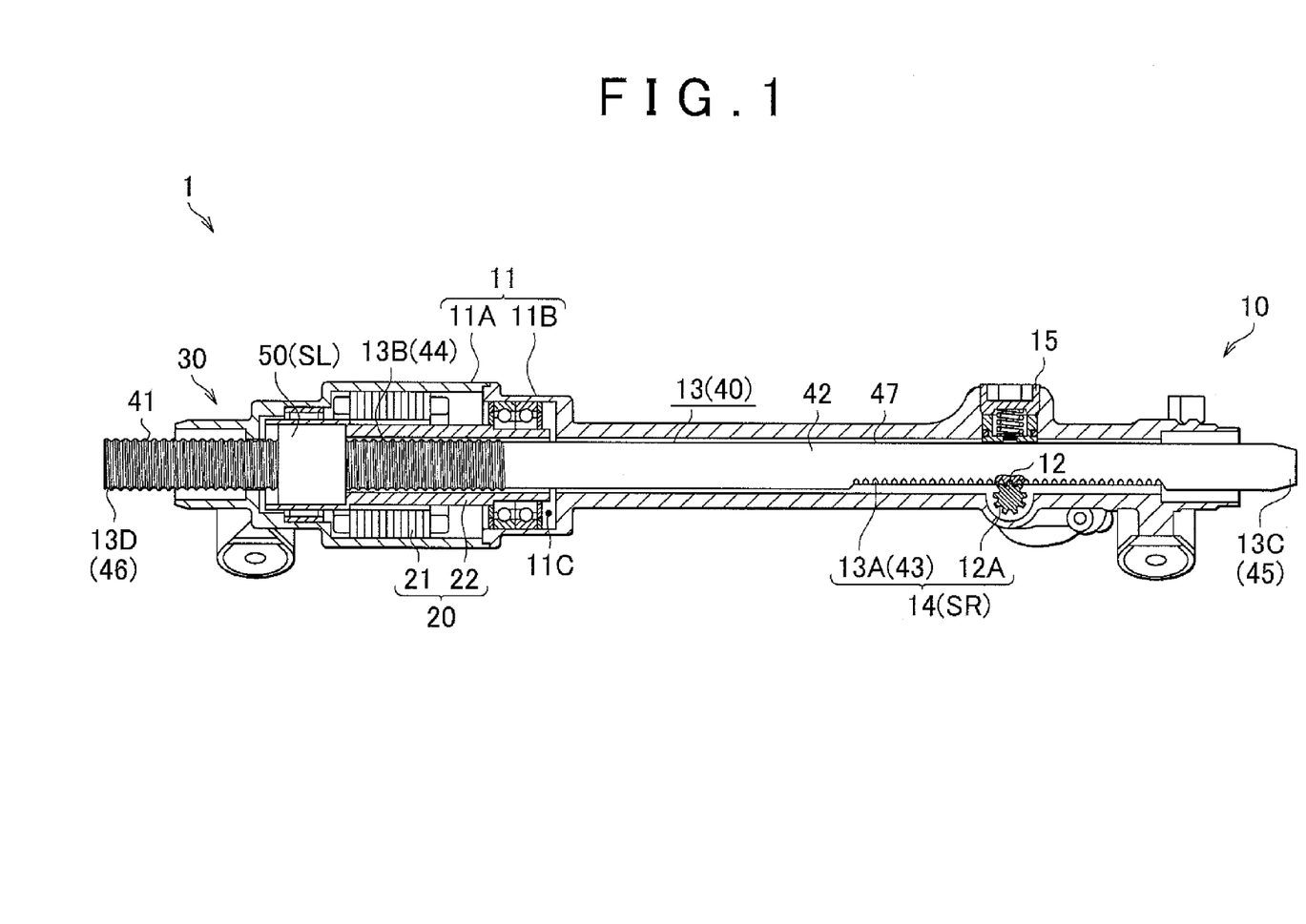
FIG. 1 is a sectional view showing an electric power steering system according to an embodiment of the invention.

The steering system body 10 includes a rack housing 11, a pinion shaft 12, the rack shaft 13, a rack-and-pinion mechanism 14, and a rack guide 15.

The rack housing 11 has a shape that extends in a width direction of a vehicle. The rack housing 11 includes a first housing 11A, a second housing 11B, and a housing space 11C.

The rack shaft 13 has a shape that extends in the width direction of the vehicle. The rack shaft 13 includes a rack gear 13A, a male thread groove 44, a rack right end 13C, and a rack left end 13D. A part of the rack shaft 13 is disposed in the housing space 11C.

A right wheel of the vehicle (not shown) is coupled to the rack right end 13C. The rack right end 13C projects from a right end of the rack housing 11. A left wheel of the vehicle (not shown) is coupled to the rack left end 13D. The rack left end 13D projects from a left end of the rack housing 11.

The rack-and-pinion mechanism 14 includes a pinion gear 12A of the pinion shaft 12 and the rack gear 13A of the rack shaft 13. The rack-and-pinion mechanism 14 converts rotation of the pinion shaft 12 to translation of the rack shaft 13.

The rack guide 15 is disposed in an opening of the second housing 11B. The rack guide 15 guides the rack shaft 13 in an axial direction of the rack shaft 13 and presses the rack shaft 13 to the pinion shaft 12.

The configuration of the ball screw 30 will be described with reference to FIG. 1 and FIG. 2.

Figure 2:
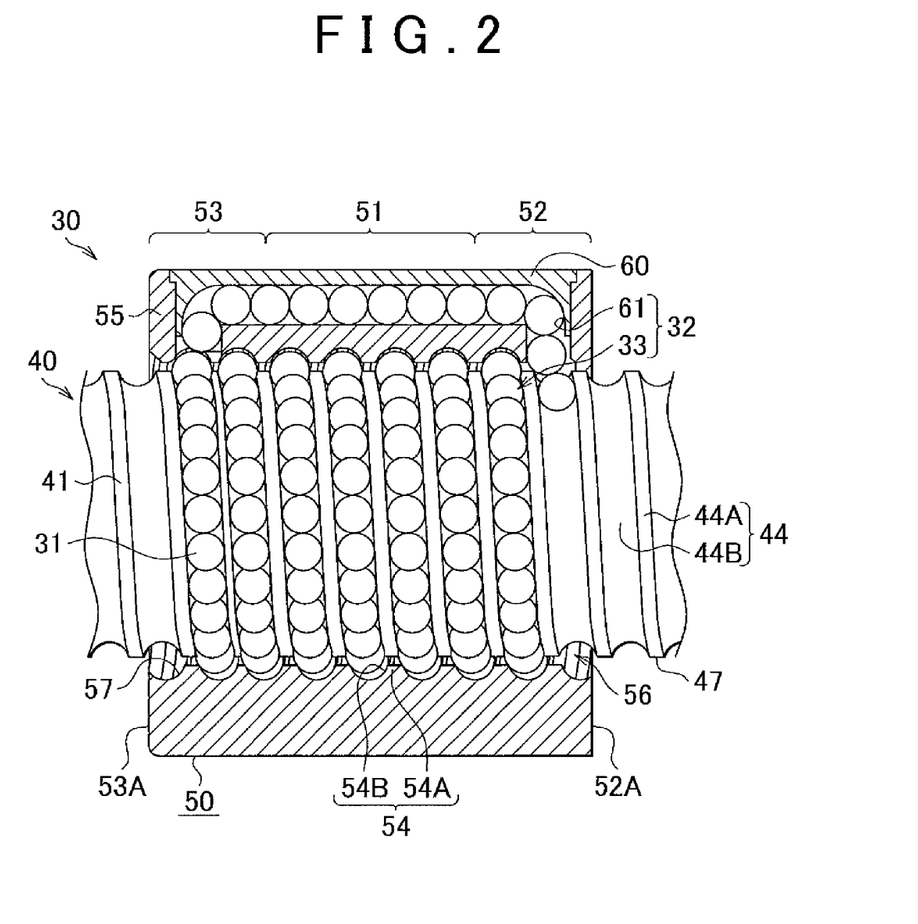
FIG. 2 is a sectional view showing a ball screw according to the embodiment.

In FIG. 2, the ball screw 30 includes a ball screw shaft 40, the ball nut 50, a deflector 60, a plurality of balls 31, and one line of a circulation path 32. A ball circulation system of the ball screw 30 is a return-plate type circulation system.

The ball screw 30 includes the ball screw shaft 40 that is integrated with the rack shaft 13. The ball screw shaft 40 and the rack shaft 13 are names assigned to the same component to indicate different aspects of the component. Therefore, the rack shaft 13 can also be referred to as the ball screw shaft 40.

The ball screw shaft 40 includes a rolling path forming portion 41, a screw shaft general portion 42 shown in FIG. 1, a screw shaft supported portion 43, the male thread groove 44, a screw shaft right end 45, a screw shaft left end 46, and a screw shaft outer surface 47.

The screw shaft general portion 42 is formed integrally with the rolling path forming portion 41. The screw shaft general portion 42 is formed to be continuous with an end of the rolling path forming portion 41. The screw shaft general portion 42 is formed in a range from a specified portion to the screw shaft left end 46. The specified portion is located on the side where the screw shaft left end 46 is located, with respect to an axially center position of the ball screw shaft 40.

The screw shaft supported portion 43 represents the same portion as the rack gear 13A. The screw shaft supported portion 43 is a part of the screw shaft outer surface 47 and is formed on the screw shaft general portion 42. The screw shaft supported portion 43 is formed in a specified range on the side where the screw shaft right end 45 is located, with respect to the axially center position of the ball screw shaft 40.

The male thread groove 44 is formed in the screw shaft outer surface 47. The male thread groove 44 is formed in a range from the screw shaft left end 46 to a boundary portion between the rolling path forming portion 41 and the screw shaft general portion 42. As shown in FIG. 2, the male thread groove 44 includes a male thread crest portion 44A and a male thread root portion 44B.

As shown in FIG. 1, the screw shaft right end 45 represents the same portion as the rack right end 13C. The screw shaft right end 45 forms a part of the screw shaft general portion 42.

The screw shaft left end 46 represents the same portion as the rack left end 13D. The screw shaft left end 46 forms a part of the rolling path forming portion 41.

As shown in FIG. 2, the male thread groove 44 is formed in a portion of the screw shaft outer surface 47, the portion of the screw shaft outer surface 47 being located on the rolling path forming portion 41. As shown in FIG. 1, the male thread groove 44 is formed in a specified range on the side where the screw shaft left end 46 is located, with respect to the axially center position of the ball screw shaft 40.

The ball nut 50 and the circulation path 32 will be described with reference to FIG. 2.

In the housing space 11C shown in FIG. 1, the ball nut 50 is disposed around the male thread groove 44 of the ball screw shaft 40. The ball nut 50 includes a nut intermediate portion 51, a nut inner side portion 52, a nut outer side portion 53, a female thread groove 54, a deflector fixing portion 55, a nut inner space 56, and a nut inner surface 57.

The nut inner side portion 52 is formed integrally with the nut intermediate portion 51. The nut inner side portion 52 is formed on the side where the screw shaft supported portion 43 is located, with respect to the nut intermediate portion 51, in the axial direction of the ball nut 50. An inner end face 52A of the nut is a right end face in the axial direction of the ball nut 50.

The nut outer side portion 53 is formed integrally with the nut intermediate portion 51. The nut outer side portion 53 is formed on an opposite side of the nut intermediate portion 51 from the screw shaft supported portion 43 in the axial direction of the ball nut 50. An outer end face 53A of the nut is a left end face in the axial direction of the ball nut 50.

The female thread groove 54 is formed in the nut inner surface 57. The female thread groove 54 is formed in a range from the nut inner side portion 52 to the nut outer side portion 53. The female thread groove 54 includes a female thread crest portion 54A and a female thread root portion 54B.

The nut inner space 56 is surrounded by the nut inner surface 57. The nut inner space 56 has a shape similar to a columnar shape. The nut inner space 56 is opened to the outside of the ball nut 50 at the inner end face 52A and the outer end face 53A.

The deflector 60 is fixed to the deflector fixing portion 55 of the ball nut 50. The deflector 60 includes a return path 61.

The circulation path 32 includes a rolling path 33 and the return path 61. The circulation path 32 is formed by connecting one end of the rolling path 33 to the other end of the rolling path 33 with the use of the return path 61. In the circulation path 32, the balls 31 in one row are circulated in the rolling path 33 and the return path 61.

The rolling path 33 is formed between the female thread groove 54 of the ball nut 50 and the male thread groove 44 of the ball screw shaft 40. A path area of the rolling path 33 varies according to an axial position in the ball nut 50. The path area of the rolling path 33 represents a sectional area of the rolling path 33 that is orthogonal to a direction in which the rolling path 33 extends.

Each of the balls 31 is disposed in the rolling path 33. After reaching an end of the row of the balls that roll in the rolling path 33, each of the balls 31 passes through the return path 61 of the deflector 60 and moves to a head of the row of the balls in the rolling path 33.

The configuration of the electric motor 20 will be described with reference to FIG. 1. The electric motor 20 is disposed around the rack shaft 13 in the housing space 11C. The electric motor 20 is disposed at a position on the side where the rack left end 13D is located, with respect to the axially center position of the rack shaft 13. The electric motor 20 includes a stator 21 and a rotor 22. The stator 21 is fitted to an inner peripheral surface of the first housing 11A. The rotor 22 is fitted to an outer peripheral surface of the ball nut 50. In the electric motor 20, the rotor 22 and the ball nut 50 are rotated together by supplying current to the stator 21.

Figure 3:
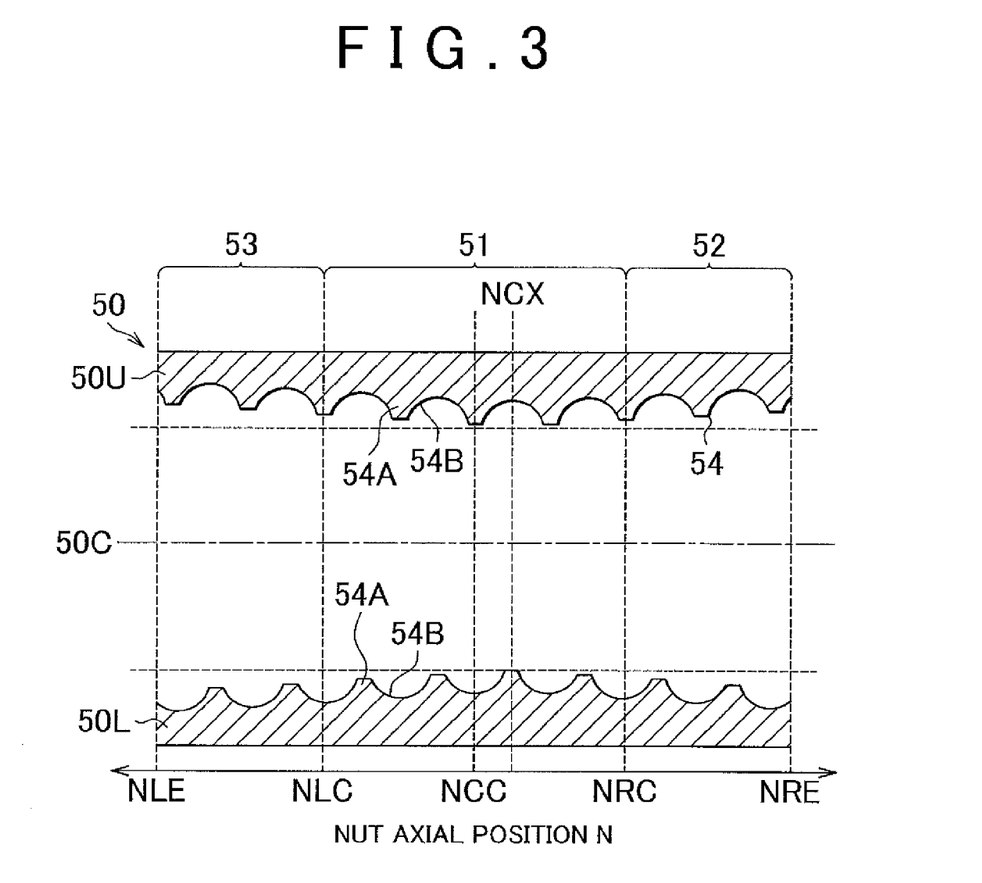
FIG. 3 is a sectional view showing a ball nut according to the embodiment.

The female thread groove 54 will be described in detail with reference to FIG. 3. FIG. 3 shows a section of the ball nut 50. A central axis 50C extending in the axial direction of the ball nut 50 will hereinafter be referred to as a nut central axis 50C.

The ball nut 50 is divided into a nut upper wall portion 50U and a nut lower wall portion 50L in a nut reference section in FIG. 3. Each of the nut upper wall portion 50U and the nut lower wall portion 50L includes the plurality of female thread crest portions 54A and the plurality of female thread root portions 54B.

A diameter of the female thread groove 54 of the ball nut 50 has three types of definitions. A diameter of the female thread groove 54 will hereinafter be referred to as a female thread diameter D. The female thread diameter D includes a diameter of a root of the female thread groove 54, a diameter of a crest of the female thread groove 54, and an effective diameter of the female thread groove 54. The female thread diameter D is determined by using the nut central axis 50C as a reference. The diameter of the root of the female thread groove 54 will hereinafter be referred to as a female thread major diameter DV. The diameter of the crest of the female thread groove 54 will hereinafter be referred to as a female thread minor diameter DM. In addition, the effective diameter of the female thread groove 54 will be referred to as a female thread effective diameter DC.

A definition of the female thread major diameter DV can be described according to the JIS standard on a diameter of a root of a female thread. In other words, the female thread major diameter DV represents a diameter of a virtual cylinder or cone that contacts a root of the female thread root portion 54B.

A definition of the female thread minor diameter DM can be described according to the JIS standard on a minor diameter of the female thread. In other words, the female thread minor diameter DM represents a diameter of a virtual cylinder or cone that contacts a crest of the female thread crest portion 54A.

A definition of the female thread effective diameter DC can be described as below. The female thread effective diameter DC represents a diameter of a virtual cylinder or cone in which a width of the female thread root portions 54B is equal to the half of the thread pitch.

Each of the female thread major diameter DV, the female thread minor diameter DM, and the female thread effective diameter DC as the female thread diameter D varies in the axial direction of the ball nut 50. In other words, the female thread diameter D is non-uniform, and varies in the axial direction of the ball nut 50. It should be noted that FIG. 2 shows the female thread groove 54 without showing change in the female thread diameter D in the axial direction of the ball nut 50.

Figure 4:
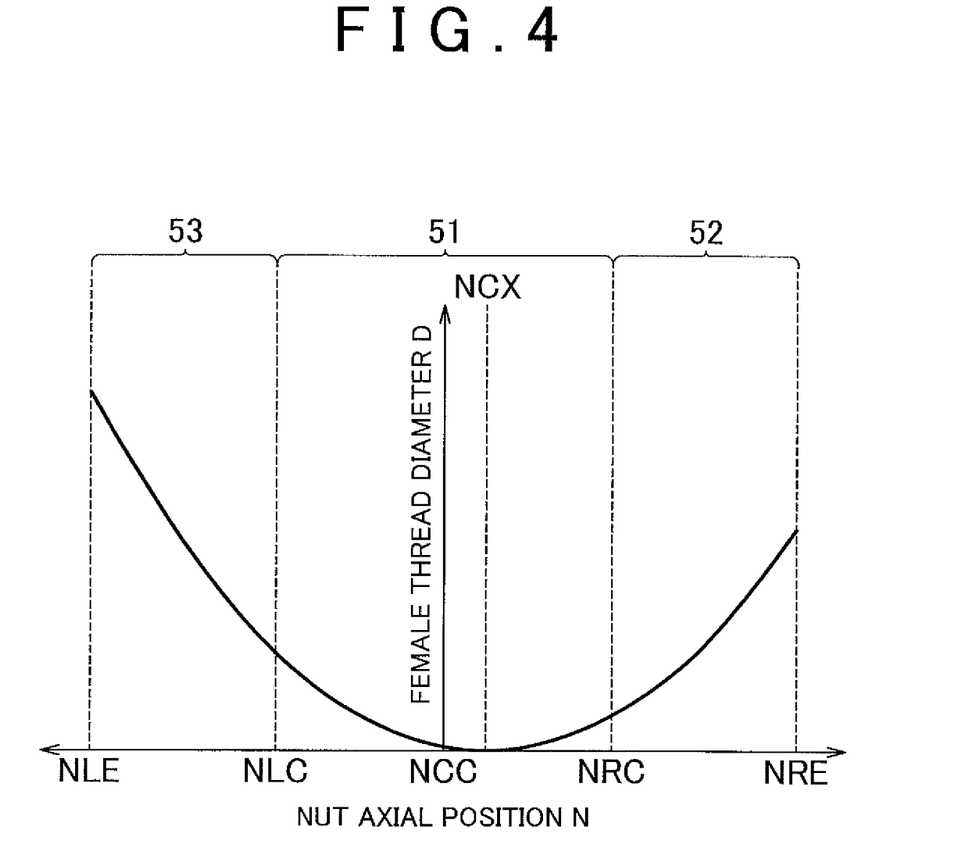
FIG. 4 is a graph relating to a ball nut according to the embodiment, and showing a relation between a nut axial position and a female thread diameter.

The female thread minor diameter DM as the female thread diameter D will be described in detail with reference to FIG. 4. FIG. 4 shows a relation between a position in the axial direction of the ball nut 50 and the female thread diameter D.

The position in the axial direction of the ball nut 50 will hereinafter be referred to as a nut axial position N, and the female thread diameter D will hereinafter be referred to as the female thread minor diameter DM.

With regard to the nut axial position N, a nut center position, a nut inner end position, a nut outer end position, a nut inner end side intermediate position, and a nut outer end side intermediate position are respectively denoted by NCC, NRE, NLE, NRC, and NLC. The nut center position NCC represents the center position of the ball nut 50 in the axial direction of the ball nut 50. The nut inner end position NRE represents a position of an end face of the nut inner side portion 52. The nut outer end position NLE represents a position of an end face of the nut outer side portion 53. The nut inner end side intermediate position NRC represents a position between the nut center position NCC and the nut inner end position NRE. The nut outer end side intermediate position NLC represents a position between the nut center position NCC and the nut outer end position NLE.

The female thread diameter D is smallest at a position between the nut center position NCC and the nut inner end position NRE, and more specifically, between the nut center position NCC and the nut inner end side intermediate position NRC. The nut axial position N in the ball nut 50, at which the female thread diameter D is smallest, will be referred to as a nut smallest diameter position NCX in the following description.

The female thread diameter D is gradually increased from the nut smallest diameter position NCX toward the nut inner side portion 52 in a range on the side where the nut inner side portion 52 is located, with respect to the nut center position NCC. The female thread diameter D is larger at the nut inner side portion 52 than at the nut center position NCC and is largest at the nut inner end position NRE in the range on the side where the nut inner side portion 52 is located.

The female thread diameter D is gradually increased from the nut smallest diameter position NCX toward the nut outer side portion 53 in a range on the side where the nut outer side portion 53 is located, with respect to the nut center position NCC. The female thread diameter D is larger at the nut outer side portion 53 than at the nut center position NCC and is largest at the nut outer end position NLE in the range on the side where the nut outer side portion 53 is located.

In a range between the nut outer end side intermediate position NLC and the nut outer end position NLE, the female thread diameter D is changed from a diameter smaller than the diameter at the nut inner end position NRE to a diameter larger than the diameter at the nut inner end position NRE. The female thread diameter D at the nut outer end position NLE is larger than the female thread diameter D at the nut inner end position NRE. The female thread diameter D at the nut outer end position NLE is largest in the entire female thread groove 54.

A relation between the balls 31 and the rolling path 33 will be described with reference to FIG. 2 and FIG. 4. The female thread diameter D of the ball nut 50 varies according to the nut axial position N. Thus, the path area of the rolling path 33 varies according to the nut axial position N. Consequently, the size of a clearance that is formed between each of the balls 31 and the female thread groove 54 or the male thread groove 44 varies according to the nut axial position N.

The female thread diameter D is gradually increased from the nut smallest diameter position NCX toward the nut inner end position NRE. Thus, the path area of the rolling path 33 is gradually increased from the nut smallest diameter position NCX toward the nut inner end position NRE. Consequently, the size of the clearance that is formed between each of the balls 31 and the female thread groove 54 or the male thread groove 44 is gradually increased from the nut smallest diameter position NCX toward the nut inner end position NRE.

The female thread diameter D is gradually increased from the nut smallest diameter position NCX toward the nut outer end position NLE. Thus, the path area of the rolling path 33 is gradually increased from the nut smallest diameter position NCX toward the nut outer end position NLE. Consequently, the size of the clearance that is formed between each of the balls 31 and the female thread groove 54 or the male thread groove 44 is gradually increased from the nut smallest diameter position NCX toward the nut outer end position NLE.

A design concept of the female thread diameter D will be described with reference to FIG. 1 and FIG. 5 to FIG. 7. In a conventional electric power steering system, a ball screw shaft as a rack shaft is supported at two positions, that is, a rack bush and a meshed portion between a pinion gear and a rack gear. In the conventional electric power steering system, the meshed portion between the pinion gear and the rack gear is located in a range on the side where one end is located, with respect to an axially center position of the rack shaft. In the conventional electric power steering system, the rack bush is located in a range on the side where the other end is located, with respect to the axially center position of the rack shaft. Accordingly, in the conventional electric power steering system, an electric motor and a ball nut are disposed in an axially intermediate portion of the rack shaft, that is, between the rack bush and the meshed portion between the pinion gear and the rack gear.

Meanwhile, a structural component of the vehicle (such as an engine or a stabilizer) is disposed in the vicinity of the rack shaft at a position that corresponds to the intermediate portion of the rack shaft. This increases a possibility of interference between the electric motor and the structural component of the vehicle in the conventional electric power steering system. Therefore, there is room for improvement in mountability of the conventional electric power steering system in the vehicle.

In order to solve the above problem, in the electric power steering system 1 (see FIG. 1), the electric motor 20 is disposed at a position different from the position at which the electric motor is disposed in the conventional electric power steering system. In the electric power steering system 1, the electric motor 20 is disposed in the range on the side where the rack left end 13D is located, with respect to the axially center position of the rack shaft 13. This reduces the possibility of interference between the structural component of the vehicle and the electric motor 20. Therefore, the mountability of the electric power steering system 1 in the vehicle is higher than that of the conventional electric power steering system.

Meanwhile, the rack bush is not provided in the electric power steering system 1 due to a change of the position at which the electric motor 20 is disposed. Accordingly, support points at which the rack shaft 13 is supported are different from the support points in the conventional electric power steering system. The electric power steering system 1 has a first support point SR and a second support point SL as the support points at which the rack shaft 13 is supported. The first support point SR is formed by a meshed portion between the pinion gear 12A and the rack gear 13A. The second support point SL is formed by the ball nut 50. It should be noted that the rack guide 15 supports the rack shaft 13 so as to increase support stiffness for the rack shaft 13 at the first support point SR.

The inventors of the present application estimated that a load applied to each of the balls 31 would be increased as compared to the conventional electric power steering system, since the second support point SL is formed by the ball nut 50. Therefore, the inventors of the present application conducted a simulation test by using an electric power steering system for testing in order to determine a relation between the nut axial position N and the load applied to the ball 31. The electric power steering system for testing will hereinafter be referred to as a testing power steering system, and the load applied to the ball 31 will hereinafter be referred as a "ball load FB". It should be noted that the testing power steering system differs from the electric power steering system 1 to which the invention is applied, in that the female thread diameter D is uniform in the entire ball nut 50. The testing power steering system has the same configuration as the configuration of the electric power steering system 1 except for the above-described difference. In the following description, a test to simulate the ball load FB will be referred to as a ball load test. In addition, components of the testing power steering system are denoted by the same reference numerals as the reference numerals of the components of the electric power steering system 1, for convenience of description.

The ball load test will be described in detail with reference to FIG. 5 and FIG. 6. In the steering system body 10, the axial position of the rack shaft 13 with respect to the rack housing 11 shown in FIG. 1 is changed. The axial position of the rack shaft 13 will hereinafter be referred to as a rack steered position WD. The rack steered position WD is changed from a neutral steered position WDC to a maximum right steered position WDR, and from the neutral steered position WDC to a maximum left steered position WDL. The neutral steered position WDC corresponds to a rack steered position at which a steered angle of wheels is zero degree. The maximum right steered position WDR represents a rack steered position at which the steered angle of the wheels is a maximum steered angle in the rightward direction. The maximum left steered position WDL represents a rack steered position at which the steered angle of the wheels is the maximum steered angle in the leftward direction.

The axial position in the rack shaft 13 will hereinafter be referred to as an in-rack position R. With regard to the in-rack position R, attention is paid to three positions, that is, an in-rack center position RC, an in-rack right end position RR, and an in-rack left end position RL. The in-rack center position RC represents the axially center position of the rack shaft 13. The in-rack right end position RR represents the position of the rack right end 13C of the rack shaft 13. The in-rack left end position RL represents the position of the rack left end 13D of the rack shaft 13.

The inventors of the present application conducted the ball load test by setting the following test condition. At least two factors were set as follows in the test condition. The rack steered position WD as a first factor was set to the maximum left steered position WDL. As a second factor, a static load with a specified magnitude in a radial direction was applied to the rack shaft 13. The inventors of the present application obtained graphs shown in FIG. 5 and FIG. 6 as an example of a result of the ball load test.

Figure 5:
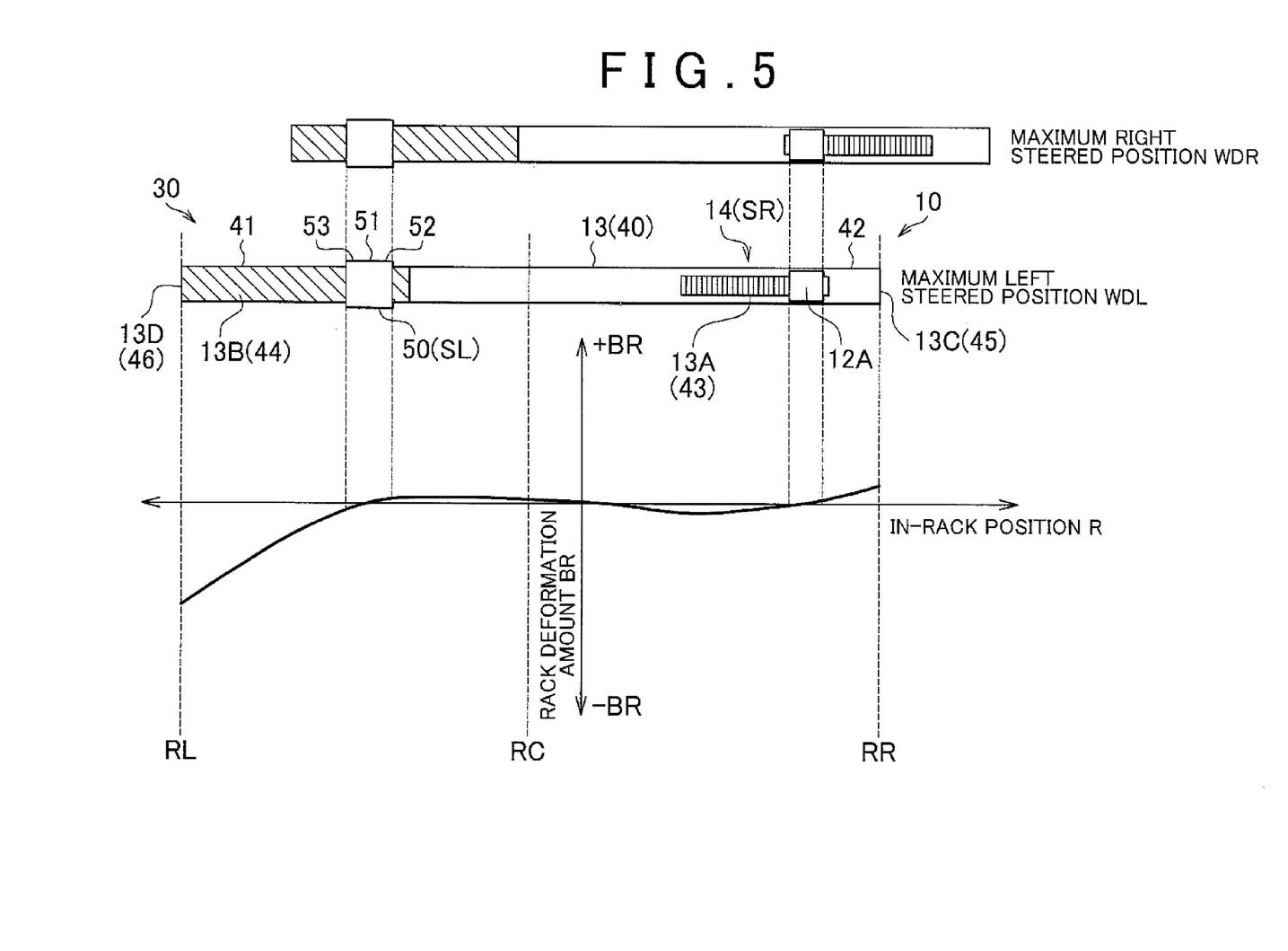
FIG. 5 is a graph relating to a rack shaft according to the embodiment, and showing a relation between a rack axial position and a rack deformation amount.

The inventors of the present application confirmed the following with regard to an amount of flexural deformation of the rack shaft 13, based on the graph in FIG. 5. The amount of flexural deformation of the rack shaft 13 will hereinafter be referred to as a rack deformation amount BR. The graph in FIG. 5 shows a relation between the in-rack position R and the rack deformation amount BR. In the graph in FIG. 5, the rack deformation amount BR in an upward direction is shown as a positive deformation amount while the rack deformation amount BR in a downward direction is shown as a negative deformation amount. The rack deformation amount BR is expressed in "mm". A vertical axis in the graph in FIG. 5 indicates zero at an original point.

The rack deformation amount BR at each of an intermediate portion of the first support point SR and an intermediate portion of the second support point SL is the minimum deformation amount. The rack deformation amount BR is increased in a positive direction from the first support point SR to the in-rack right end position RR. The rack deformation amount BR at the in-rack right end position RR is the maximum deformation amount in a range on the right side with respect to the in-rack center position RC. The rack deformation amount BR is shown as deformation amounts in a negative direction and the positive direction in a range from the first support point SR to the second support point SL. The rack deformation amount BR is increased in the negative direction from the second support point SL to the in-rack left end position RL. The rack deformation amount BR at the in-rack left end position RL is the maximum deformation amount in a range on the left side with respect to the in-rack center position RC. The rack deformation amount BR at the in-rack left end position RL is larger than the rack deformation amount BR at the in-rack right end position RR. The rack deformation amount BR at the in-rack left end position RL is the maximum deformation amount in the entire rack shaft 13.

Figure 6:
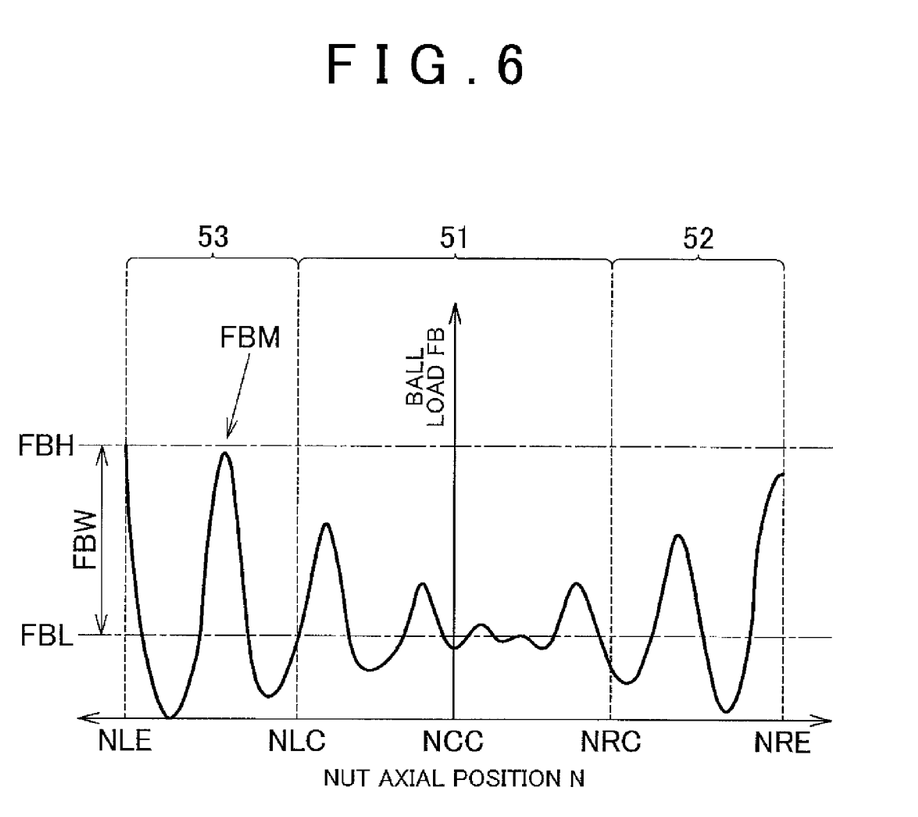
FIG. 6 is a graph relating to a ball screw in an electric power steering system for testing, and showing a relation between the nut axial position and a ball load.

The inventors of the present application confirmed the following with respect to the ball load FB, based on the graph in FIG. 6. The graph in FIG. 6 shows a relation between the nut axial position N and the ball load FB in the testing power steering system. A curve in the graph in FIG. 6 represents an approximate curve of the ball load FB applied to each of the balls 31. The ball load FB is expressed in "N". A vertical axis in the graph in FIG. 6 indicates zero at an original point. A horizontal axis in the graph in FIG. 6 indicates the nut center position NCC at the original point.

The value of the ball load FB applied to each of the balls 31 varies depending on the nut axial position N. In the rack shaft 13, among all the balls 31, the balls 31 that are present in directions of flexural deformation are pressed to the ball nut 50. Thus, the ball load FB exhibits its peak in each turn in the row of the balls 31. Accordingly, the graph in FIG. 6 has a plurality of peak values of the ball load FB. In the following description, the minimum value of the plurality of peak values will be referred to as a minimum peak value FBL, the maximum value of the plurality of peak values will be referred to as a maximum peak value FBM, and the maximum value of the ball load FB will be referred to as a maximum load value FBH.

The peak value of the ball load FB varies depending on the nut axial position N. The peak value of the ball load FB at a position between the nut center position NCC and the nut inner end side intermediate position NRC is a minimum peak value FBL. The peak value of the ball load FB is increased from the position at which the ball load FB takes the minimum peak value FBL, toward the nut inner end position NRE. The peak value of the ball load FB is also increased from the position at which the ball load FB takes the minimum peak value FBL, toward the nut outer end position NLE. The peak value of the ball load FB at a peak closest to the nut inner end position NRE is the maximum peak value in a range on the right side with respect to the nut center position NCC. The peak value of the ball load FB at a peak closest to the nut outer end position NLE is the maximum peak value in a range on the left side with respect to the nut center position NCC. The peak value of the ball load FB at the peak closest to the nut outer end position NLE is larger than the peak value of the ball load FB at the peak closest to the nut inner end position NRE, and the peak value of the ball load FB at the peak closest to the nut outer end position NLE is a maximum peak value FBM. The ball load FB at the nut outer end position NLE is larger than the ball load FB at the nut inner end position NRE and the maximum peak value FBM. The ball load FB at the nut outer end position NLE is a maximum load value FBH.

The inventors of the present application confirmed that a difference between the minimum peak value FBL and the maximum load value FBH in the testing power steering system differs from that in the conventional electric power steering system, based on the result of the ball load test. The difference between the minimum peak value FBL and the maximum load value FBH will hereinafter be referred to as a load variation range FBW. The load variation range FBW in the testing power steering system is larger than the load variation range FBW in the conventional electric power steering system.

The inventors of the present application estimated a reason for the difference in the load variation range FBW as follows. In the conventional electric power steering system, the rack shaft is supported at two support points, in other words, the rack bush and the meshed portion between the pinion gear and the rack gear. In addition, in the conventional electric power steering system, the electric motor and the ball nut are provided at the axially intermediate portion of the rack shaft. Accordingly, the flexural deformation of the rack shaft is received at the above-described two support points, and thus a range of the amount of flexural deformation of the rack shaft between the support points is small. Consequently, a range of a force with which the rack shaft presses the balls to the ball nut is also small. Therefore, the conventional electric power steering system has the small load variation range FBW.

On the other hand, the ball nut 50 forms the second support point SL in the testing power steering system, and thus the flexural deformation of the rack shaft 13 is likely to be reflected in the ball load FB. As shown in FIG. 5, the rack deformation amount BR on the rack left end 13D-side is larger than the rack deformation amount BR at a position between the first support point SR and the second support point SL. Accordingly, each of the balls 31 disposed between the nut outer end side intermediate position NLC and the nut outer end position NLE receives a large force from the rack shaft 13, as compared to the balls 31 disposed at any other positions. In other words, the load applied to the balls 31 by the flexural deformation of the rack shaft 13 is concentrated on the balls 31 in the vicinity of the nut outer end position NLE. Therefore, the load variation range FBW in the testing power steering system is larger than the load variation range FBW in the conventional electric power steering system.

The inventors of the present application considered reducing the load variation range FBW in the testing power steering system, based on the above-described reason. The inventors of the present application thus devised an idea to reduce the ball load FB in the vicinity of the nut outer end position NLE by increasing a clearance between each of the balls 31 and the female thread groove 54 or the male thread groove 44 in the vicinity of the nut outer end position NLE. As shown in FIG. 4, in order to increase the clearance, the inventors of the present application adopted a method in which the female thread diameter D is increased in a range from the nut smallest diameter position NCX at which the ball load FB takes the minimum peak value FBL to the nut outer end position NLE.

Based on the ball load test, the inventors of the present application confirmed that the peak value of the ball load FB in the vicinity of the nut inner end position NRE is larger than the peak value of the ball load FB in the vicinity of the nut center position NCC, in addition to that the load variation range FBW in the testing power steering system is large.

The inventors of the present application estimated a reason why the above-described magnitude relation is established, as follows. As shown in FIG. 5, the rack deformation amount BR on the nut inner side portion 52-side is larger than the rack deformation amount BR at the nut center position NCC and at a position close to the nut center position NCC. Accordingly, the rack deformation amount BR at a portion of the rack shaft 13 that is surrounded by the nut inner side portion 52 is larger than the rack deformation amount BR at a portion of the rack shaft 13 that corresponds to the nut center position NCC and a position close to the nut center position NCC. Consequently, each of the balls 31 disposed in the nut inner side portion 52 receives a large force from the rack shaft 13, as compared to the balls 31 disposed at the nut center position NCC and at a position close to the nut center position NCC. Therefore, the peak value of the ball load FB at a position close to the nut inner end position NRE is larger than the peak value of the ball load FB at a position close to the nut center position NCC.

The inventors of the present application considered reducing the load variation range FBW in the testing power steering system, based on the above-described reason. As a result, the inventors of the present application set the nut smallest diameter position NCX to a position at which the ball load FB takes the minimum peak value FBL. Then, the inventors of the present application devised an idea to reduce the ball load FB in the vicinity of the nut inner end position NRE by increasing a clearance between each of the balls 31 and the female thread groove 54 or the male thread groove 44 in the vicinity of the nut inner end position NRE. As shown in FIG. 4, in order to increase the clearance, the inventors of the present application adopted a method in which the female thread diameter D is increased in a range from the nut smallest diameter position NCX to the nut inner end position NRE.

Based on the ball load test, the inventors of the present application confirmed that the peak value of the ball load FB in the vicinity of the nut outer end position NLE is larger than the peak value of the ball load FB in the vicinity of the nut inner end position NRE, in addition to that the load variation range FBW in the testing power steering system is large. In addition to this relation of the peak values, the inventors of the present application further confirmed that the ball load FB at the nut outer end position NLE takes the maximum load value FBH, based on the ball load test.

The inventors of the present application estimated a reason why the above-described magnitude relation is established, as follows. As shown in FIG. 5, the rack deformation amount BR on the side where the rack left end 13D is located with respect to the second support point SL is larger than the rack deformation amount BR at a portion between the first support point SR and the second support point SL. Accordingly, the rack deformation amount BR at a portion of the rack shaft 13 that is surrounded by the nut outer side portion 53 is larger than the rack deformation amount BR at a portion of the rack shaft 13 that is surrounded by the nut inner side portion 52. Consequently, each of the balls 31 disposed in the nut outer side portion 53 receives a large force from the rack shaft 1, as compared to the balls 31 disposed in the nut inner side portion 52. Therefore, the peak value of the ball load FB at a position close to the nut outer end position NLE is larger than the peak value of the ball load FB at a position close to the nut inner end position NRE.

As shown in FIG. 5, the rack deformation amount BR at the in-rack left end position RL is the largest deformation amount. Consequently, the ball 31 disposed at the nut outer end position NLE receives a large force from the rack shaft 13, as compared to the balls 31 disposed at positions other than the nut outer end position NLE. Therefore, the ball load FB at the nut outer end position NLE takes the maximum load value FBH.

The inventors of the present application considered reducing the load variation range FBW in the testing power steering system based on the above-described reason. Then, the inventors of the present application devised an idea to reduce the load variation range FBW by making the clearance between each of the balls 31 and the female thread groove 54 or the male thread groove 44 at the nut outer end position NLE larger than that at the nut inner end position NRE. As shown in FIG. 4, in order to form the clearance as described above, the inventors of the present application adopted a method in which the female thread diameter D at the nut outer end position NLE is made larger than the female thread diameter D at the nut inner end position NRE.

Operations of the electric power steering system 1 will be described with reference to FIG. 4 and FIG. 7. The ball nut 50 has the female thread diameter D that is shown in FIG. 4. Thus, the clearance between each of the balls 31 and the female thread groove 54 or the male thread groove 44 is gradually increased from the nut smallest diameter position NCX to the nut outer end position NLE or to the nut inner end position NRE. Accordingly, the clearance between each of the balls 31 disposed in a portion, in which the rack deformation amount BR is large, and the female thread groove 54 or the male thread groove 44 is larger than the clearance between each of the balls 31 disposed in a portion, in which the rack deformation amount BR is small, and the female thread groove 54 or the male thread groove 44.

Consequently, a small load is applied to each of the balls 31 disposed in the portion where the rack deformation amount BR is large, as compared to the ball screw 30 of the testing power steering system, that is, the ball screw 30 in which the female thread diameter D is uniform in the entire ball nut 50. Therefore, it is possible to prevent a situation where a large load is applied to a part of the plurality of balls 31.

The inventors of the present application conducted the ball load test to determine a relation between the nut axial position N and the ball load FB by using the electric power steering system 1 and by setting the same test condition as that for the ball load test conducted using the testing power steering system. The inventors of the present application obtained a graph shown in FIG. 7 as an example of a result of the ball load test.

Figure 7:
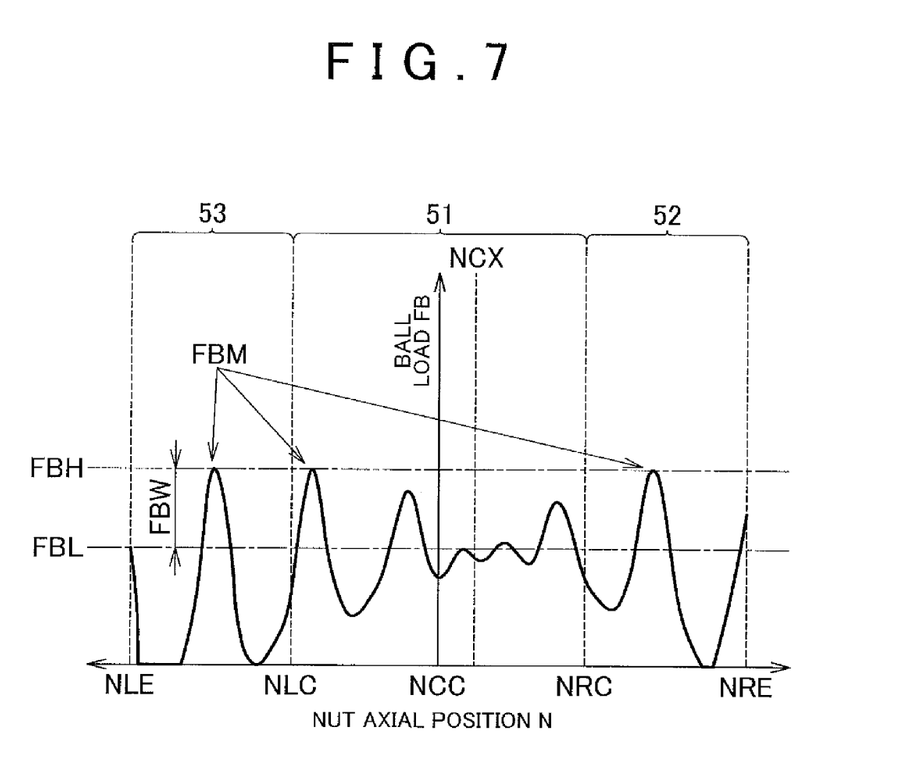
FIG. 7 is a graph relating to the ball screw according to the embodiment, and showing a relation between the nut axial position and the ball load.

The inventors of the present application confirmed the following with regard to the ball load FB, based on the graph in FIG. 7. The graph in FIG. 7 shows the relation between the nut axial position N and the ball load FB in the electric power steering system 1. A curve in the graph in FIG. 7 represents an approximate curve of the ball load FB applied to each of the balls 31, which is plotted on coordinate axes. In the graph in FIG. 7, the ball load FB is expressed in "N". A vertical axis in the graph in FIG. 7 indicates zero at an original point. A horizontal axis in the graph in FIG. 7 indicates the nut center position NCC at the original point. The graph in FIG. 7 has the same scale as that in the graph of FIG. 6.

The peak value of the ball load FB varies depending on the nut axial position N. The peak value of the ball load FB at the nut smallest diameter position NCX between the nut center position NCC and the nut inner end side intermediate position NRC is the minimum peak value FBL. The peak value of the ball load FB at each of following three points is the maximum peak value FBM. A first point is located between the nut inner end side intermediate position NRC and the nut inner end position NRE. A second point is located between the nut outer end side intermediate position NLC and the nut center position NCC, and more specifically, in the vicinity of the nut outer end side intermediate position NLC. A third point is located between the nut outer end side intermediate position NLC and the nut outer end position NLE. Each of the maximum peak values FBM is the same as the maximum load value FBH. The ball load FB at the nut inner end position NRE is smaller than the maximum peak value FBM and is larger than the minimum peak value FBL. The ball load FB at the nut outer end position NLE is smaller than the maximum peak value FBM and is larger than the minimum peak value FBL.

The minimum peak value FBL in FIG. 7 is larger than the minimum peak value FBL in the testing power steering system shown in FIG. 6. The maximum peak value FBM in FIG. 7 is smaller than the maximum peak value FBM and the maximum load value FBH in the testing power steering system shown in FIG. 6. In other words, the load variation range FBW in the electric power steering system 1 is smaller than the load variation range FBW in the testing power steering system.

The electric power steering system 1 to which the invention is applied achieves the following effects. 1) The electric power steering system 1 includes the ball screw 30. The ball screw 30 includes the ball screw shaft 40, the ball nut 50, and the plurality of balls 31. The female thread diameter D of the ball nut 50 varies according to the position in the axial direction of the ball nut 50. The female thread diameter D is set according to the rack deformation amount BR. With this configuration, it is possible to prevent the situation where a large load is applied to a part of the plurality of balls 31.

2) The electric power steering system 1 includes the ball screw shaft 40 configured to be integrated with the rack shaft 13. Therefore, when the flexural deformation of the rack shaft 13 is caused by a load input from a road surface, a load is applied to each of the balls 31 due to the flexural deformation. Meanwhile, the ball screw 30 has a structure in which the female thread diameter D varies according to the position in the axial direction of the ball nut 50. With this configuration, it is possible to prevent the situation where a large load is applied to a part of the plurality of balls 31 due to a load input from a road surface.

3) The female thread diameter D of the ball nut 50 is larger at each of the axially ends of the ball nut 50 than at the axially intermediate portion of the ball nut 50. With this configuration, the clearance between each of the balls 31 disposed at each of the axially ends of the ball nut 50 and the male thread groove 44 or the female thread groove 54 is larger than the clearance between each of the balls 31 disposed at the axially intermediate portion of the ball nut 50 and the male thread groove 44 or the female thread groove 54. Therefore, the ball load FB at each of the axially ends of the ball nut 50 is small, as compared to a ball screw in which the female thread diameter D at the axially intermediate portion of the ball nut 50 is the same as the female thread diameter D at each of the axially ends of the ball nut 50.

4) The female thread diameter D of the ball nut 50 is larger at the nut outer end position NLE and at a position close to the nut outer end position NLE than at the nut inner end position NRE and at a position close to the nut inner end position NRE. With this configuration, the clearance between each of the balls 31 disposed in the vicinity of the nut outer end position NLE and the male thread groove 44 or the female thread groove 54 is larger than the clearance between the each of balls 31 disposed in the vicinity of the nut inner end position NRE and the male thread groove 44 or the female thread groove 54. Therefore, the ball load FB in the vicinity of the nut outer end position NLE is small, as compared to a ball screw in which the female thread diameter D at the nut outer end position NLE and at the position close to the nut outer end position NLE is the same as the female thread diameter D at the nut inner end position NRE and at the position close to the nut inner end position NRE.

5) The female thread diameter D of the ball nut 50 is smallest at the position on the side where the nut inner end position NRE is located, with respect to the nut center position NCC. This position is the nut smallest diameter position NCX. With this configuration, the clearance between each of the balls 31 disposed at the nut center position NCC and the male thread groove 44 or the female thread groove 54 is larger than the clearance between each of the balls 31 disposed at the nut smallest diameter position NCX and the male thread groove 44 or the female thread groove 54. Therefore, the ball load FB at the nut center position NCC is small, as compared to a ball screw in which the female thread diameter D is smallest at the nut center position NCC.

6) In the testing power steering system, in the entire ball nut 50, the female thread diameter D is uniform in the axial direction. Therefore, the load variation range FBW is large. On the other hand, in the electric power steering system 1, the female thread diameter D varies in the axial direction of the ball nut 50. Therefore, the load variation range FBW is smaller than that in the ball screw of the testing power steering system. In the case where the size of the ball screw 30 of the electric power steering system 1 is set to be the same as the ball screw of the testing power steering system, the electric power steering system 1 can receive a larger load than a load that can be received by the testing power steering system. Alternatively, in the case where the condition regarding a usage environment is set to be the same as that in the testing power steering system, the size of the ball screw 30 of the electric power steering system 1 can be made smaller than the size of the ball screw of the testing power steering system.

7) The ball screw 30 of the electric power steering system 1 has the following advantages over a ball screw in a comparative example, which will be described below. The ball screw in the comparative example has the constant female thread diameter D and includes a plurality of balls with different sizes. In the ball screw in the comparative example, a clearance between each of the balls and a female thread groove or a male thread groove is set to vary in an axial direction by disposing the balls with different sizes in a rolling path. Accordingly, the load variation range FBW in the ball screw of the comparative example is smaller than that in the ball screw of the testing power steering system. However, work for selecting the size of the ball for each portion of the rolling path is required in a process of producing the ball screw in the comparative example. This may reduce production efficiency.

On the other hand, in the ball screw 30, the clearance between each of the balls 31 and the female thread groove 54 or the male thread groove 44 varies in the axial direction by changing the female thread diameter D in the axial direction of the ball nut 50. Accordingly, unlike the ball screw in the comparative example, there is no need to select the size of the ball 31 for each portion of the rolling path 33 in the production process. Therefore, the production efficiency is improved, as compared to the ball screw in the comparative example.

8) In the electric power steering system 1, the electric motor 20 is disposed in the range on the side where the end is located with respect to the axially intermediate portion of the rack shaft 13, and the rack shaft 13 is supported at the first support point SR and the second support point SL. Therefore, the mountability of the electric power steering system 1 in the vehicle is improved, as compared to the conventional electric power steering system. In the electric power steering system 1, since the rack shaft 13 is supported at the first support point SR and the second support point SL, the load applied to the balls 31 is larger than that in the conventional electric power steering system. On the other hand, as described above, the ball nut 50 of the electric power steering system 1 has the female thread diameter D that varies in the axial direction of the ball nut 50. Accordingly, it is possible to prevent the situation where a large load is applied to a part of the plurality of balls 31. Therefore, it is possible to prevent a situation where the ball nut 50 and each of the balls 31 are damaged due to the structure in which the rack shaft 13 is supported at the first support point SR and the second support point SL. In other words, it is possible to improve the mountability of the electric power steering system 1 in the vehicle and to secure a preferable service life of the ball screw 30 in the electric power steering system 1.

The ball screw and the electric power steering system of the invention may be realized in embodiments other than the above-described embodiment. Modified examples of the above-described embodiment will hereinafter be described as other embodiments of the ball screw and the electric power steering system. The following modified examples may be combined with each other.

The circulation system for the balls 31 of the ball screw 30 is the return-plate type circulation system in the above-described embodiment. However, the circulation system for the balls is not limited to that exemplified in the above-described embodiment. For example, in the ball screw 30 in a modified example, the circulation system for the balls 31 is an end-cap type circulation system, an end-deflector type circulation system, an internal-deflector type circulation system, or a return-tube type circulation system. A description will hereinafter be made on how the female thread diameter D is set in each of the ball screws in which the circulation systems are used.

a) A description will be provided on the female thread diameter D of the ball screw in which the end-cap type circulation system is used. The ball screw in which the end-cap type circulation system is used will hereinafter be referred to as an end-cap type ball screw. The end-cap type ball screw includes one line of a circulation path. The circulation path has a configuration based on the configuration of the circulation path 32 in the ball screw 30 in the above-described embodiment. Therefore, the female thread diameter D of the end-cap type ball screw is set on the basis of the female thread diameter D of the ball screw 30 in the above-described embodiment.

b) A description will be provided on the female thread diameter D of the ball screw in which the end-deflector type circulation system is used. The ball screw in which the end-deflector type circulation system is used will hereinafter be referred to as an end-deflector type ball screw. The end-deflector type ball screw includes one line of a circulation path. The circulation path has a configuration based on the configuration of the circulation path 32 in the ball screw 30 in the above-described embodiment. Therefore, the female thread diameter D of the end-deflector type ball screw is set on the basis of the female thread diameter D in the ball screw 30 in the above-described embodiment.

c) A description will be provided on the female thread diameter D of the ball screw in which the internal-deflector type circulation system is used. The ball screw in which the internal-deflector type circulation system is used will hereinafter be referred to as an internal-deflector type ball screw. The internal-deflector type ball screw has a plurality of lines of circulation paths. Each of the circulation paths is formed as a path with one turn. The female thread diameters D of the circulation paths are different from each other. For example, when the internal-deflector type ball screw includes five lines of the circulation paths, the female thread diameter D of each of the circulation paths is determined as follows.

The internal-deflector type ball screw includes a minimum diameter circulation path, an inner end circulation path, an outer end circulation path, an inner end side intermediate circulation path, and an outer end side intermediate circulation path, as the five lines of the circulation paths 32. The minimum diameter circulation path is formed across the nut smallest diameter position NCX. The inner end circulation path is formed between the nut inner end position NRE and the nut inner end side intermediate position NRC. The outer end circulation path is formed between the nut outer end position NLE and the nut outer end side intermediate position NLC. The inner end side intermediate circulation path is formed across the nut inner end side intermediate position NRC, at a position between the minimum diameter circulation path and the inner end circulation path. The outer end side intermediate circulation path is formed across the nut outer end side intermediate position NLC, at a position between the minimum diameter circulation path and the outer end circulation path.

The female thread diameter D of the minimum diameter circulation path is the smallest female thread diameter among the female thread diameters D of the plurality of circulation paths. The female thread diameter D of the minimum diameter circulation path is constant in the minimum diameter circulation path. For example, the female thread diameter D of the minimum diameter circulation path is the same as the female thread diameter D at the nut center position NCC shown in FIG. 4.

The female thread diameter D of the inner end circulation path is the second largest female thread diameter among the female thread diameters D of the plurality of circulation paths. The female thread diameter D of the inner end circulation path is constant in the inner end circulation path. For example, the female thread diameter D of the inner end circulation path is the same as the female thread diameter D at the nut inner end position NRE shown in FIG. 4.

The female thread diameter D of the outer end circulation path is the largest female thread diameter among the female thread diameters D of the plurality of circulation paths. The female thread diameter D of the outer end circulation path is constant in the outer end circulation path. For example, the female thread diameter D of the outer end circulation path is the same as the female thread diameter D at the nut outer end position NLE shown in FIG. 4.

The female thread diameter D of the inner end side intermediate circulation path is the fourth largest female thread diameter among the female thread diameters D of the plurality of circulation paths. The female thread diameter D of the inner end side intermediate circulation path is constant in the inner end side intermediate circulation path. For example, the female thread diameter D of the inner end side intermediate circulation path is the same as the female thread diameter D at the nut inner end side intermediate position NRC shown in FIG. 4.

The female thread diameter D of the outer end side intermediate circulation path is the third largest female thread diameter among the female thread diameters D of the plurality of circulation paths. The female thread diameter D of the outer end side intermediate circulation path is constant in the outer end side intermediate circulation path. For example, the female thread diameter D of the outer end side intermediate circulation path is the same as the female thread diameter D at the nut outer end side intermediate position NLC shown in FIG. 4.

d) A description will be provided on the female thread diameter D of the ball screw in which the return-tube type circulation system is used. The ball screw in which the return-tube type circulation system is used will hereinafter be referred to as a return-tube type ball screw. The return-tube type ball screw includes a plurality of circulation paths. The circulation paths have a configuration based on the circulation paths of the internal-deflector type ball screw. Therefore, the female thread diameter D of each of the circulation paths in the return-tube type ball screw is set on the basis of the female thread diameter D of each of the circulation paths in the internal-deflector type ball screw.

A nut combination type of the ball screw 30 in the above-described embodiment is a single nut type. However, the nut combination type is not limited to that exemplified in the above-described embodiment. For example, the nut combination type of the ball screw in a modified example is a double nut type or an integral nut type.

The ball screw 30 in the above-described embodiment includes the ball screw shaft 40 that is formed of a metal material. However, the material for the ball screw shaft 40 is not limited to that exemplified in the above-described embodiment. For example, the ball screw 30 in a modified example includes the ball screw shaft 40 that is formed of a resin material.

The ball screw 30 in the above-described embodiment includes the ball nut 50 that is formed of a metal material. However, the material for the ball nut 50 is not limited to that exemplified in the above-described embodiment. For example, the ball screw 30 of the modified example includes the ball nut 50 that is formed of a resin material.

The ball screw 30 in the above-described embodiment includes the deflector 60 that is formed of a metal material. However, the material for the deflector 60 is not limited to that exemplified in the above-described embodiment. For example, the ball screw 30 in a modified example includes the deflector 60 that is formed of a resin material.

The ball screw 30 in the above-described embodiment includes the ball nut 50 that surrounds a part of the male thread groove 44. However, the configuration of the ball nut 50 is not limited to that exemplified in the above-described embodiment. For example, the ball screw 30 in a modified example includes the ball nut 50 that surrounds the entire male thread groove 44.

In the electric power steering system 1 in the above-described embodiment, the rack bush is not provided and the rack shaft 13 is supported at the first support point SR and the second support point SL. However, the supporting structure for the rack shaft 13 is not limited to that exemplified in the above-described embodiment. For example, the electric power steering system 1 in a modified example includes the rack bush in addition to the first support point SR and the second support point SL. The rack bush is fitted at a position between the rack gear 13A and the rack right end 13C or at a position between the rack gear 13A and a male thread groove 13B, for example. The ball nut 50 has the female thread diameter D that reflects the rack deformation amount BR in a case where the rack bush is present. In other words, the female thread diameter D varies in the axial direction of the ball nut 50.

The rack shaft 13 in the above-described embodiment includes the rack gear 13A in the range on the side where the rack right end 13C is located, with respect to the in-rack center position RC, and includes the male thread groove 13B in the range on the side where the rack left end 13D is located, with respect to the in-rack center position RC. In other words, the ball screw shaft 40 includes the screw shaft supported portion 43 in the range on the side where the screw shaft right end 45 is located, with respect to the axially center position, and includes the male thread groove 44 in the range on the side where the screw shaft left end 46 is located, with respect to the axially center position. Therefore, the first support point SR is formed in the range on the side where the rack right end 13C is located, with respect to the in-rack center position RC. In addition, the second support point SL is formed in the range on the side where the rack left end 13D is located, with respect to the in-rack center position RC. However, the positions, at which the rack gear 13A, in other words, the screw shaft supported portion 43, the male thread groove 13B, in other words, the male thread groove 44, the first support point SR, and the second support point SL are formed, are not limited to those exemplified in the above-described embodiment. For example, the electric power steering system 1 in a modified example has a structure in which the positions, at which the rack gear 13A and the like are formed, are laterally reversed with respect to the in-rack center position RC.

The assist system of the electric power steering system 1 in the above-described embodiment is the rack-coaxial type assist system. However, the assist system of the electric power steering system 1 is not limited to that exemplified in the above-described embodiment. For example, the electric power steering system in a modified example has a rack-parallel type assist system. In the rack-parallel type assist system, the electric motor is disposed at a position away from the rack shaft in a manner such that the electric motor is located in parallel with the rack shaft, and torque of the electric motor is transmitted to the ball nut by a belt or chain.

The ball screw 30 in the above-described embodiment constitutes a part of the electric power steering system 1. However, a system to which the ball screw 30 is applied is not limited to that exemplified in the above-described embodiment. For example, the ball screw in a modified example is used for a semiconductor production system, an industrial robot, or a machine tool.

What is claimed is:
1. A ball screw comprising:
a ball screw shaft;
a ball nut;
a plurality of balls; and
a rolling path, wherein
the ball screw shaft has a screw shaft outer surface and a male thread groove,
the ball nut is a component that surrounds a part of the male thread groove or the entire male thread groove, the ball nut having a nut inner surface and a female thread groove,
the balls are disposed in the rolling path,
the rolling path is formed between the ball screw shaft and the ball nut,
the male thread groove is formed in the screw shaft outer surface and forms a part of the rolling path,
the female thread groove is formed in the nut inner surface and forms a part of the rolling path, and
a female thread diameter that is a diameter of the female thread groove varies according to a position in an axial direction of the ball nut, the female thread diameter being larger at each axial end of the ball nut than at an axially intermediate portion of the ball nut, and the female thread diameter being larger at one axial end than at the other axial end.

2. The ball screw according to claim 1, wherein
the ball screw shaft includes a rolling path forming portion, a screw shaft general portion, and a screw shaft supported portion,
the male thread groove is formed in a portion of the screw shaft outer surface, the portion of the screw shaft outer surface being located on the rolling path forming portion,
the screw shaft general portion is formed to be continuous with the rolling path forming portion,
the screw shaft supported portion is formed as a part of the screw shaft general portion,
the ball nut includes a nut intermediate portion, a nut inner side portion, and a nut outer side portion,
the nut inner side portion is formed to be continuous with the nut intermediate portion and is formed on a side where the screw shaft general portion is located, with respect to the nut intermediate portion,
the nut outer side portion is formed to be continuous with the nut intermediate portion and is formed on an opposite side of the nut inner side portion in the axial direction of the ball nut with respect to the nut intermediate portion, and
the female thread diameter is larger on an inner side and an outer side with respect to the nut intermediate portion in the axial direction of the ball nut than at the nut intermediate portion, and the female thread diameter is larger at an end of the nut outer side portion than at an end of the nut inner side portion.

3. The ball screw according to claim 2, wherein
the female thread diameter is smallest at a position on a side where the nut inner side portion is located, with respect to an axially center position of the ball nut.

4. An electric power steering system comprising:
the ball screw according to claim 3;
a rack shaft;
a pinion shaft; and
an electric motor, wherein
the electric motor includes a stator and a rotor,
the rotor is fitted to the ball nut, and
the ball screw shaft is configured to be integrated with the rack shaft.

5. An electric power steering system comprising:
the ball screw according to claim 2;
a rack shaft;
a pinion shaft; and
an electric motor, wherein
the electric motor includes a stator and a rotor,
the rotor is fitted to the ball nut, and
the ball screw shaft is configured to be integrated with the rack shaft.

6. An electric power steering system comprising:
the ball screw according to claim 2;
a rack shaft;
a pinion shaft; and
an electric motor, wherein
the pinion shaft includes a pinion gear,
the electric motor includes a stator and a rotor,
the rotor is fitted to the ball nut,
the ball screw shaft is configured to be integrated with the rack shaft and includes a rack gear as the screw shaft supported portion,
the male thread groove is formed in a range on a side where one end of the ball screw shaft is located, with respect to an axially center position of the ball screw shaft,
the screw shaft supported portion is formed in a range on a side where the other end of the ball screw shaft is located, with respect to the axially center position of the ball screw shaft, and
the ball screw shaft is supported at the ball nut and at a meshed portion between the rack gear and the pinion gear.

7. An electric power steering system comprising:
the ball screw according to claim 1;
a rack shaft;
a pinion shaft; and
an electric motor, wherein
the electric motor includes a stator and a rotor,
the rotor is fitted to the ball nut, and
the ball screw shaft is configured to be integrated with the rack shaft.

* * * * *